US006622026B1

(12) United States Patent
Ishinaga et al.

(10) Patent No.: US 6,622,026 B1
(45) Date of Patent: Sep. 16, 2003

(54) RADIO WAVE RECEIVING AND RECORDING APPARATUS

(75) Inventors: Hiroyuki Ishinaga, Tokyo (JP); Ichiro Saito, Yokohama (JP); Yoshiyuki Imanaka, Kawasaki (JP); Nobuyuki Matsumoto, Tokyo (JP); Masao Mori, Kawasaki (JP); Yoichi Taneya, Yokohama (JP); Muga Mochizuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 598 days.

(21) Appl. No.: 09/591,220

(22) Filed: Jun. 12, 2000

(30) Foreign Application Priority Data

Jun. 14, 1999 (JP) ........................................... 11-167376

(51) Int. Cl.$^7$ ................................................ H04B 1/38
(52) U.S. Cl. ....................... 455/557; 455/415; 455/563; 379/93.23; 379/142.06; 704/235; 704/271
(58) Field of Search ................................. 455/414, 415, 455/417, 422, 550, 557, 563, 566; 704/200, 231, 235, 270, 270.1, 271, 275, 277; 379/93.23, 142.01, 142.04, 142.06, 142.15, 142.17, 207.15

(56) References Cited

U.S. PATENT DOCUMENTS

| | | | | |
|---|---|---|---|---|
| 5,327,486 A | * | 7/1994 | Wolff et al. ............... | 379/93.23 |
| 5,809,464 A | * | 9/1998 | Kopp et al. ................. | 704/235 |
| 6,173,259 B1 | * | 1/2001 | Bijl et al. ................... | 704/235 |
| 6,198,916 B1 | * | 3/2001 | Martin et al. ............... | 455/566 |
| 6,389,279 B1 | * | 5/2002 | Calabrese et al. .......... | 455/417 |

\* cited by examiner

Primary Examiner—Quochien Vuong
(74) Attorney, Agent, or Firm—Fitzpatrick, Cella, Harper & Scinto (57) ABSTRACT

Information transmitted through radio is recorded in telephone communications using radio. Provision is made of a radio wave receiving portion for receiving a radio wave signal, a voice data holding portion for demodulating the radio wave signal received by the radio wave receiving portion into voice data, and holding it, a data converting portion for converting the voice data held by the voice data holding portion into a character code, an image data holding portion for converting the character code converted by the data converting portion into image data, and holding it, a recording element portion for recording the image data held in the image data holding portion on a recording medium, a synchronous signal outputting portion for outputting a synchronous signal synchronized with the timing at which the image data held in the image data holding portion is delivered to the recording element portion, and a motor for conveying the recording medium on the basis of the synchronous signal outputted from the synchronous signal outputting portion.

13 Claims, 9 Drawing Sheets

RADIO WAVE RECEIVING AND RECORDING APPARATUS

BACKGROUND OF THE INVENTION

1. Field of the Invention

This invention relates to a recording apparatus, and particularly to a radio wave receiving and recording apparatus capable of recording information transmitted through radio.

2. Related Background Art

In telephone communication using radio, information is transmitted by voice or character display.

Of the conventional telephone communications using radio as described above, in the telephone communication wherein information is transmitted by voice, the recognition of the information by the sense of sight cannot be effected and therefore, when an aurally handicapped person utilizes such telephone communication, there is the problem that such a person cannot recognize the transmitted information.

Also, in the telephone communication wherein information is transmitted by character display, display is effected at a speed based on a voice output and therefore, there occurs a case where before the information displayed is recognized, the next information is displayed, and this leads to the possibility that the information cannot be accurately recognized.

SUMMARY OF THE INVENTION

The present invention has been made in view of the above-noted problem peculiar to the prior art, and has as its object to provide a recording apparatus which can record information transmitted through radio in telephone communications or the like using radio.

To achieve the above object, the present invention provides a radio wave receiving and recording apparatus for recording information transmitted by a radio wave signal on a recording medium, characterized by:

a radio wave receiving portion for receiving the radio wave signal;

converting means for converting the radio wave signal received by the radio wave receiving portion into recordable data;

a recording element portion for recording the data converted by the converting means on the recording medium;

a synchronous signal outputting portion for outputting a synchronous signal synchronized with the timing at which the data converted by the converting means is delivered to the recording element portion; and position controlling means for changing the relative position of the recording apparatus and the recording medium on the basis of the synchronous signal outputted from the synchronous signal outputting portion.

Also, the present invention provides a radio wave receiving and recording apparatus for recording information transmitted by a radio wave signal on a recording medium, characterized by:

a radio wave receiving portion for receiving the radio wave signal;

a recognizing portion for recognizing ID information imparted to the radio wave signal received by the radio wave receiving portion, and outputting the radio wave signal only when the ID information is predetermined information;

converting means for converting the radio wave signal outputted from the recognizing portion into recordable data;

a recording element portion for recording the data converted by the converting means on the recording medium;

a synchronous signal outputting portion for outputting a synchronous signal synchronized with the timing at which the data converted by the converting means is delivered to the recording element portion; and position controlling means for changing the relative position of the recording apparatus and the recording medium on the basis of the synchronous signal outputted from the synchronous signal outputting portion.

Also, the radio wave receiving and recording apparatus of the present invention is characterized in that the synchronous signal outputting portion outputs n (n being a natural number) synchronous signals each time the data converted by the converting means is delivered by a pixel to the recording element portion.

Also, the radio wave receiving and recording apparatus of the present invention is characterized in that the converting means has:

a voice data holding portion for demodulating the radio wave signal received by the radio wave receiving portion into voice data, and holding it;

a data converting portion for converting the voice data held in the voice data holding portion into a character code; and an image data holding portion for converting the character code converted by the data converting portion into image data, and holding it.

Also, the radio wave receiving and recording apparatus of the present invention is characterized in that the image data holding portion delivers the held image data by one line each to the recording element portion.

Also, the radio wave receiving and recording apparatus of the present invention is characterized in that the data converting portion has the voice data and a character code corresponding to the voice data preset therein, and compares and calculates the voice data held in the voice data holding portion and the character code to thereby convert the voice data held in the voice data holding portion into the character code.

Also, the radio wave receiving and recording apparatus of the present invention is characterized in that the image data holding portion has the character code and image data corresponding to the character code preset therein, and compares and calculates the character code converted by the data converting portion and the image data to thereby convert the character code into the image data.

Also, the radio wave receiving and recording apparatus of the present invention is characterized in that it has a clock for recognizing the time when the radio wave has been received, and the recording element portion records on the recording medium the image data and the time when the image data has been received.

Also, the radio wave receiving and recording apparatus of the present invention is characterized in that the position controlling means conveys the recording medium on the basis of the synchronous signal outputted from the synchronous signal outputting portion.

Also, the radio wave receiving and recording apparatus of the present invention is characterized in that the position controlling means is a motor.

The radio wave receiving and recording apparatus of the present invention is characterized in that the radio wave signal is a radio wave signal transmitted and received by a pocket telephone preset correspondingly to the recording apparatus.

Also, the radio wave receiving and recording apparatus of the present invention is characterized in that the radio wave receiving portion, the converting means and the recording element portion are provided in a recording head detachably attachable to the recording apparatus.

The above-mentioned character code may be a word code such as word and phrase or a data code registered in the data pose.

In the present invention constructed as described above, when a radio wave signal used in the communication between pocket telephones or the like is received by the radio wave receiving portion, the radio wave signal received by the radio wave receiving portion is converted into recordable data by the converting means, and the converted data is recorded on the recording medium in the recording element portion, and a synchronous signal synchronized with the timing at which the data converted by the converting means is delivered to the recording element portion is outputted from the synchronous signal outputting portion, and the position controlling means is driven on the basis of the synchronous signal, and the relative position of the recording apparatus and the recording medium is changed.

As described above, the received radio wave signal is converted into recordable data, and the relative position of the recording apparatus and the recording medium is changed in synchronism with the recording of the converted data and therefore, information transmitted through radio is accurately recorded.

DESCRIPTION OF THE PREFERRED EMBODIMENTS

Some embodiments of the present invention will hereinafter be described with reference to the drawings.

Figure 1:
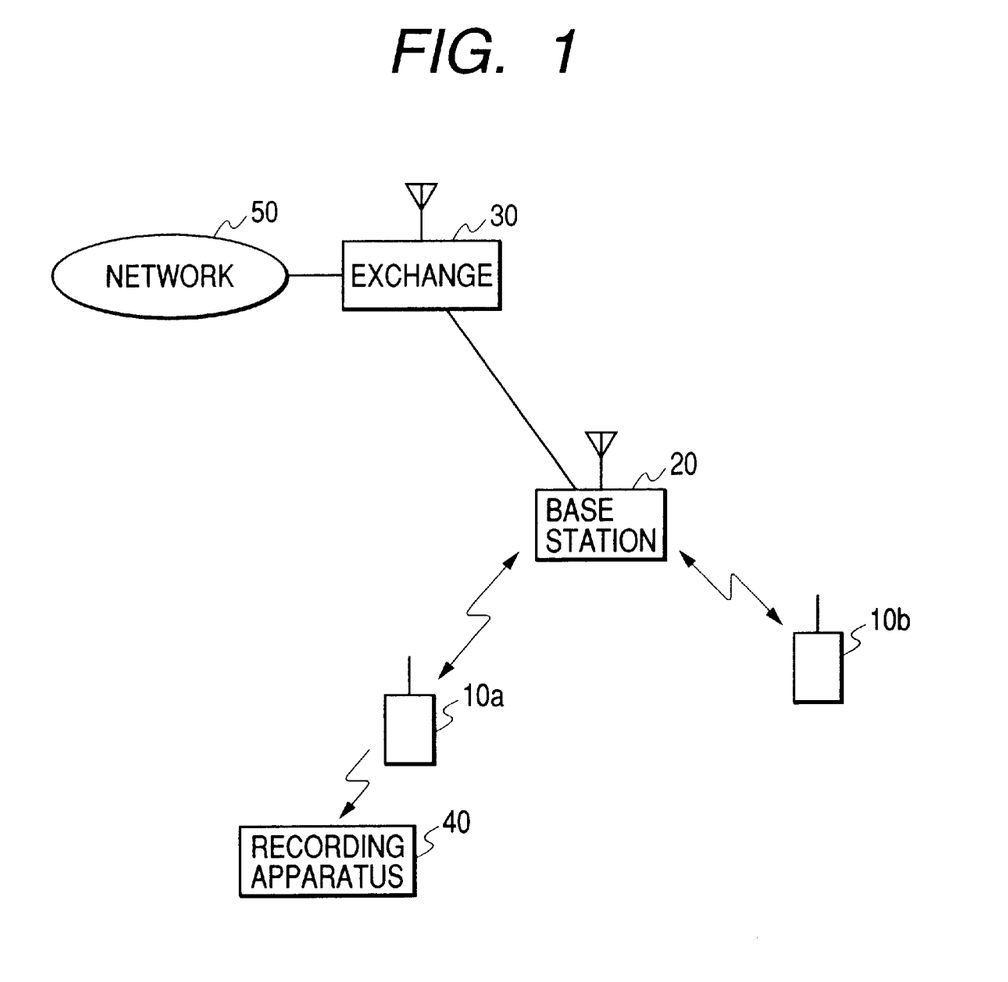
FIG. 1 shows an example of the construction of a telephone communication system in which the radio wave receiving and recording apparatus of the present invention is used.

FIG. 1 shows an example of the construction of a telephone communication system in which the radio wave receiving and recording apparatus of the present invention is used.

This example of the construction is comprised of a plurality of pocket telephones 10a, 10b, a base station 20 connected to the pocket telephones 10a, 10b through radio, an exchange 30 for effecting the control of exchange with the pocket telephones 10a, 10b and the base station 20, and a radio wave receiving and recording apparatus 40 for receiving information transmitted and received by the pocket telephone 10a by a radio wave, and effecting recording, and the exchange 30 is connected to a network 50. While in the present example of the construction, two pocket telephones 10a and 10b are provided and a base station 20 is provided, these numbers are not restrictive.

In the telephone communication system constructed as described above, when the pocket telephone 10a and the pocket telephone 10b effect a communication therebetween, the communication is effected through the base station 20 and the exchange 30, and the information transmitted and received by the pocket telephone 10a is received by a radio wave in the radio wave receiving and recording apparatus 40 and is recorded thereby.

First Embodiment

Figure 2:
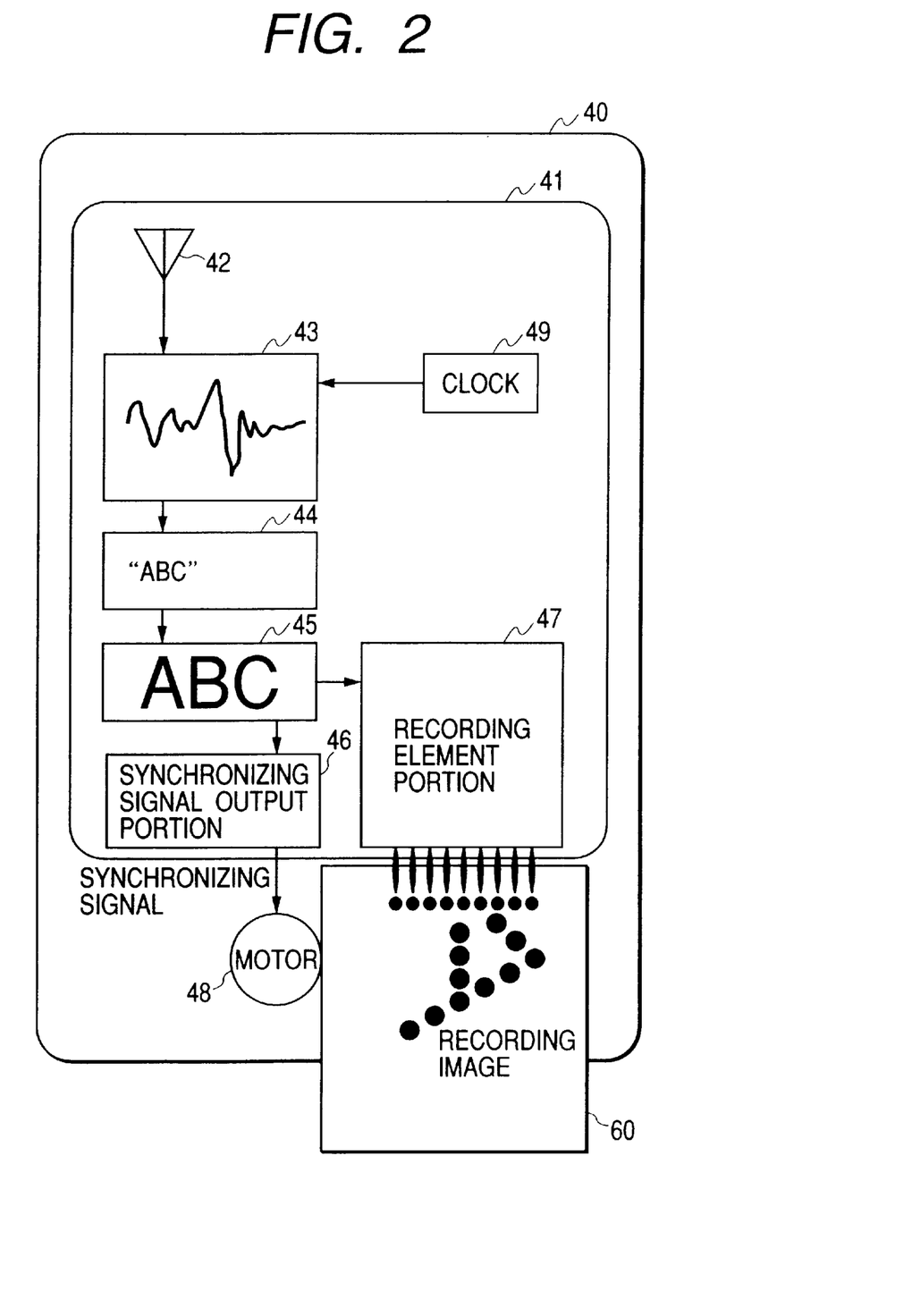
FIG. 2 shows a first embodiment of the radio wave receiving and recording apparatus shown in FIG. 1.

FIG. 2 shows a first embodiment of the radio wave receiving and recording apparatus shown in FIG. 1.

This embodiment, as shown in FIG. 2, is comprised of a recording head 41 for recording the information transmitted and received by the pocket telephone 10a on a recording medium 60, and a motor 48 which is position controlling means for conveying the recording medium 60 on the basis of the information transmitted and received by the pocket telephone 10a. The recording head 41 is comprised of a radio wave receiving portion 42 for receiving the information transmitted and received by the pocket telephone 10a by a radio wave, a voice data holding portion 43 for tuning and demodulating the information received by the radio wave receiving portion 42 and converting it into voice data and holding the voice data, a data converting portion 44 for character-recognizing the voice data held by the voice data holding portion 43, and converting it into a character code and outputting the character code, an image data holding portion 45 for converting or evolving the character code outputted from the data converting portion 44 into image data, and holding it as image data, a recording element portion 47 for recording the image data held in the image data holding portion 45 on the recording medium 60, a synchronous signal outputting portion 46 for delivering a synchronous signal for driving the motor 48 on the basis of the image data held in the image data holding portion 45, and a clock 49.

Description will hereinafter be made of the operation of recording the information transmitted from the pocket telephone in the radio wave receiving and recording apparatus constructed as described above.

When voice information is inputted to the pocket telephone 10a, the inputted voice information is converted into an analog or digital signal, which is transmitted as a radio wave signal.

The radio wave signal transmitted from the pocket telephone 10a is received by the base station 20 and is also received by the radio wave receiving portion 42 in the radio wave receiving and recording apparatus 40.

The radio wave signal received by the radio wave receiving portion 42 is demodulated in the voice data holding portion 43, and is held as voice data. Also, the time when the radio wave signal has been received by the radio wave receiving portion 42 is held in the voice data holding portion 43 with the voice data by the use of the clock 49.

Next, in the data converting portion 44, the voice data held in the voice data holding portion 43 is converted from waveform data into a character code. Here, in the data converting portion 44, the character code and voice waveform data corresponding thereto are preset, and actually the voice waveform data held in the voice data holding portion 43 and the character code are compared with each other and are calculated, whereby character recognition is effected.

Next, in the image data holding portion 45, the character code converted by the data converting portion 44 is converted into image data, which is held. Here, in the image data holding portion 45, the image data and a character code corresponding thereto are preset, and actually the character code recognized by the data converting portion 44 and the image data are compared with each other and calculated, whereby the character code is converted into image data.

Thereafter, the image data held in the image data holding portion 45 is delivered by one line each to the recording element portion 47, and in the recording element portion 47, the image data delivered from the image data holding portion 45 is recorded on the recording medium 60 with the time when the data is received by the radio wave receiving portion 42.

Also, in the synchronous signal outputting portion 46, a synchronous signal for driving the motor 48 in synchronism with the timing at which the image data held in the image data holding portion 45 is delivered to the recording element portion 47 is outputted, and the motor 48 is rotated on the basis of this synchronous signal, whereby the recording medium 60 is conveyed. In the synchronous signal outputted to the motor 48, n (n being a natural number) synchronous signals are outputted to the motor 48 each time the image data held in the image data holding portion 45 is delivered by a pixel to the recording element portion 47. A character code may be a word code such as word and phrase or a data code registered in the data base.

By the above-described series of operations, the information transmitted from the pocket telephone 10a is recorded on the recording medium 60.

Description will hereinafter be made of the recording operation for the information received by the pocket telephone in the radio wave receiving and recording apparatus constructed as described above.

When in the pocket telephone 10a, information is received by a radio wave, the received information is also received in the radio wave receiving portion 42 in the radio wave receiving and recording apparatus 40.

The operation of the radio wave receiving and recording apparatus thereafter is similar to the recording operation for the information transmitted from the pocket telephone 10a.

Figure 3:
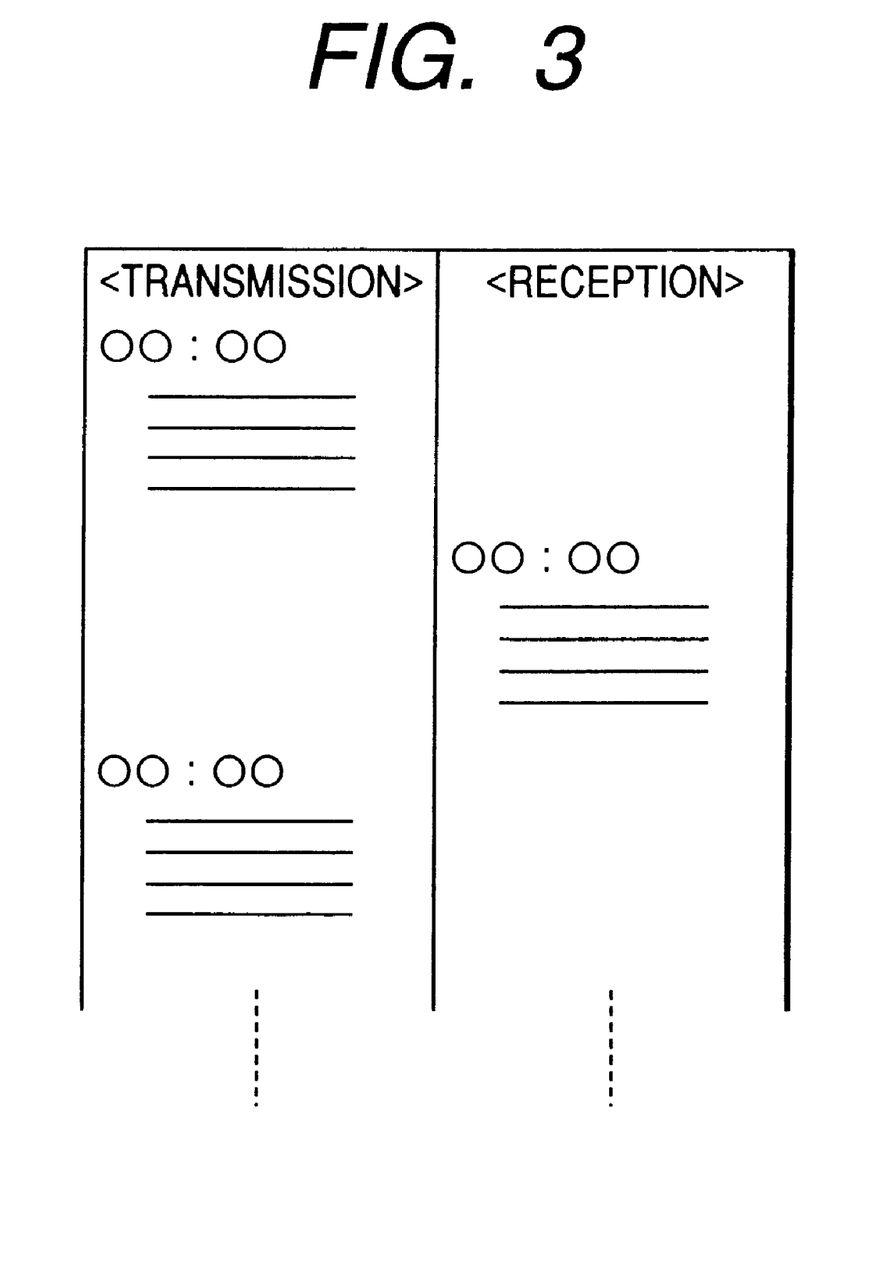
FIG. 3 shows an example of information recorded by the use of the radio wave receiving and recording apparatus shown in FIG. 2.

FIG. 3 shows an example of information recorded by the use of the radio wave receiving and recording apparatus shown in FIG. 2.

As shown in FIG. 3, the information transmitted from the pocket telephone 10a and the information received by the pocket telephone 10a are recorded on the recording medium 60 with the times thereof.

While in the present embodiment, in the radio wave receiving and recording apparatus 40, a radio wave signal is received by being tuned with the radio wave signal transmitted and received by the pocket telephone 10a, the radio wave signal may be received by intercepting by tuning with the communication between the pocket telephone 10a and the base station 20. Further, the radio wave receiving and recording apparatus 40 in itself may be adjusted to execute the above-mentioned series of recording operations by receiving a radio wave signal while communicating with a pose station 20 directly.

Second Embodiment

Figure 4:
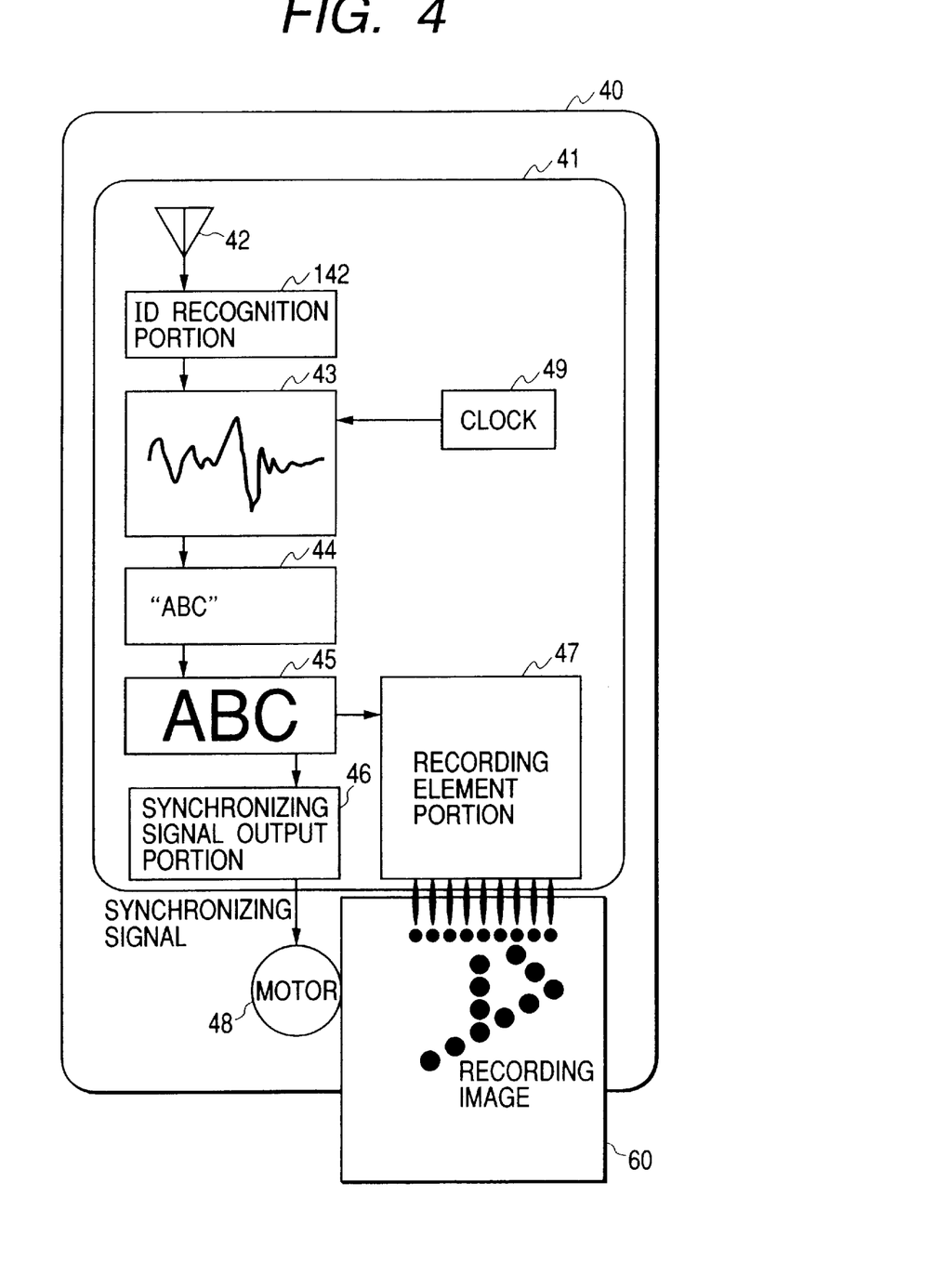
FIG. 4 shows a second embodiment of the radio wave receiving and recording apparatus shown in FIG. 1.

FIG. 4 shows a second embodiment of the radio wave receiving and recording apparatus shown in FIG. 1.

This embodiment, as shown in FIG. 4, is comprised of a recording head 141 for recording the information transmitted and received by the pocket telephone 10a on the recording medium 60, and a motor 48 for conveying the recording medium 60 on the basis of the information transmitted and received by the pocket telephone 10a. The recording head 141 is comprised of a radio wave receiving portion 42 for receiving the information transmitted and received by the pocket telephone 10a by a radio wave, an ID recognizing portion 142 for recognizing ID information preset in the pocket telephone 10a from the information received by the radio wave receiving portion 42, a voice data holding portion 43 for tuning and demodulating the information received by the radio wave receiving portion 42 and converting it into voice data, and holding the voice data, a data converting portion 44 for character-recognizing the voice data held in the voice data holding portion 43, converting it into a character code and outputting the character code, an image data holding portion 45 for converting or evolving the character code outputted from the data converting portion 44 into image data, and holding it as image data, a recording element portion 47 for recording the image data held in the image data holding portion 45 on the recording medium 60, a synchronous signal outputting portion 46 for delivering a synchronous signal for driving the motor 48 on the basis of the image data held in the image data holding portion 45, and a clock 49.

Description will hereinafter be made of the operation of recording the information transmitted from the pocket telephone in the radio wave receiving and recording apparatus constructed as described above.

When voice information is inputted to the pocket telephone 10a, the inputted voice information is converted into an analog or digital signal, which is transmitted as a radio wave signal with the ID information preset in the pocket telephone 10a.

The radio wave signal transmitted from the pocket telephone 10a is received by the base station 20 and is also received by the radio wave receiving portion 42 in the radio wave receiving and recording apparatus 140.

When the radio wave signal is received by the radio wave receiving portion 42, whether the ID information imparted to the radio wave signal is the ID of the pocket telephone 10a is judged in the ID recognizing portion 142, and if it is judged to be the ID of the pocket telephone 10a, the radio wave signal received by the radio wave receiving portion 42 is demodulated in the voice data holding portion 43, and is held as voice data. Also, the time when the radio wave signal received has been received by the radio wave receiving portion 42 is held in the voice data holding portion 43 with the voice data.

Next, in the data converting portion 44, the voice data held in the voice data holding portion 43 is converted from waveform data into a character code. Here, in the data converting portion 44, the character code and voice waveform data corresponding thereto are preset, and the voice waveform data actually held in the voice data holding portion 43 and the character code are compared and calculated, whereby character recognition is effected.

Next, in the image data holding portion 45, the character code converted by the data converting portion 44 is converted into image data, which is held. Here, in the image data holding portion 45, the image data and a character code corresponding thereto are preset, and the character code actually recognized by the data converting portion 44 and the image data are compared and calculated, whereby the character code is converted into image data.

Thereafter, the image data held in the image data holding portion 45 is delivered by one line each to the recording element portion 47, in which the image data delivered from the image data holding portion 45 is recorded on the recording medium 60 with the time when this data has been received by the radio wave receiving portion 42.

Also, in the synchronous signal outputting portion 46, a synchronous signal for driving the motor 48 in synchronous with the timing at which the image data held in the image data holding portion 45 is delivered to the recording element portion 47 is outputted, and the motor 48 is rotated on the basis of this synchronous signal, whereby the recording medium 60 is conveyed.

By the above-described series of operations, the information transmitted from the pocket telephone 10a is recorded on the recording medium 60.

In addition, information from the pocket telephone 10a to the recording apparatus 40 may be only the above-mentioned code. Further, a character code may be a word code such as word and phrase or a data code registered in the data base.

Description will hereinafter be made of the operation of recording the information received by the pocket telephone in the radio wave receiving apparatus constructed as described above.

When information is received by a radio wave in the pocket telephone 10a, the received information is also received by the radio wave receiving portion 42 in the radio wave receiving and recording apparatus 40.

The operation of the radio wave receiving and recording apparatus thereafter is similar to the operation of recording the information transmitted from the pocket telephone 10a.

While in the above-described embodiment, the information transmitted and received by the pocket telephone 10a is recorded by the radio wave receiving and recording apparatus, the present invention is not restricted thereto, but the radio wave receiving and recording apparatus may function as an independent terminal exclusively for reception, and only the information received by the radio wave receiving and recording apparatus may be recorded.

Third Embodiment

Figure 5:
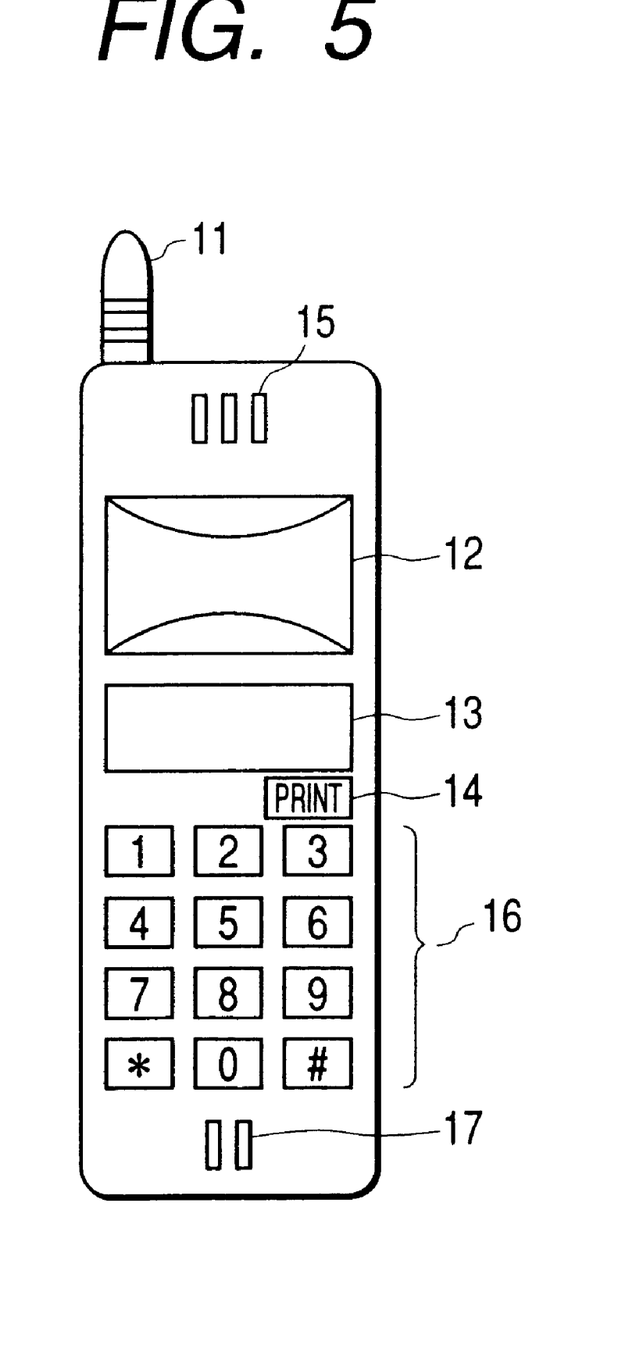
FIG. 5 shows a third embodiment of the radio wave receiving and recording apparatus of the present invention.

FIG. 5 shows a third embodiment of the radio wave receiving and recording apparatus of the present invention.

As shown in FIG. 5, in this embodiment, the radio wave receiving and recording apparatus shown in FIG. 2 is provided as a printer portion 13 in the pocket telephone, and by depressing a print key 14, information received by a radio wave receiving portion in the printer portion 13 is printed.

In the radio wave receiving and recording apparatus constructed as described above, transmitted information is received by an antenna 11, and is displayed on a display portion 12 or is outputted as voice from a speaker 15.

When a user tries to print out the sent information, the information is also received by the radio wave receiving portion in the printer portion 13 and therefore, simply by depressing the print key 14, the received information is printed out.

Also, when other data signal than voice information is sent to the apparatus, a print starting signal is imparted to the head of this signal at the start of the transmission of a data signal on the transmitter side, whereby the received data signal is automatically printed out without the print key 14 being depressed on the receiver side.

Conversation data pre-recorded as a voice memorandum can also be printed out.

As described above, the radio wave receiving and recording apparatus is contained in the pocket telephone, whereby a memorandum during telephone communication or data such as a map can be printed out at a place of outing and only the necessary portion of received data can be printed out.

While in the present embodiment, a radio wave is received by both of the antenna 11 and the radio wave receiving portion in the printer portion 13, the radio wave received by the antenna 11 can also be changed over to one of the main body of the pocket telephone and the printer portion 13.

Fourth Embodiment

Figure 6:
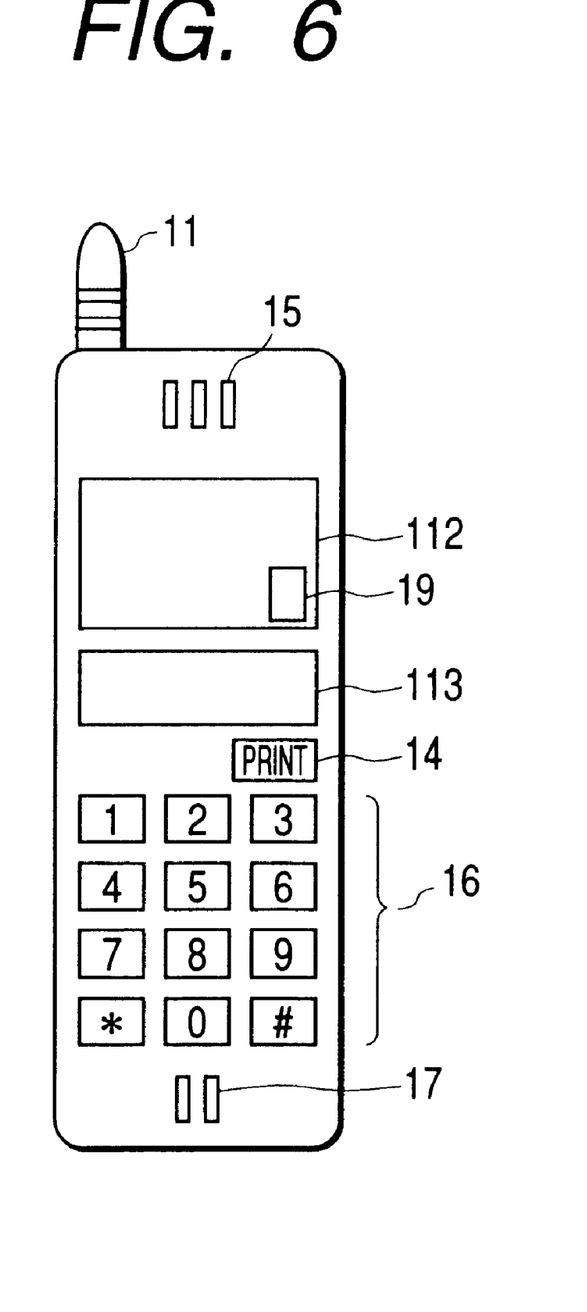
FIG. 6 shows a fourth embodiment of the radio wave receiving and recording apparatus of the present invention.

FIG. 6 shows a fourth embodiment of the radio wave receiving and recording apparatus of the present invention.

In this embodiment, a radio wave receiving portion is not provided in a printer portion 113, and by a print key 14, information received by an antenna 11 is changed over to one of the main body of the pocket telephone and the printer portion 113 and is outputted. Also, when the information received by the antenna 11 is outputted to the main body of the pocket telephone, mode display 19 in a display portion 112 assumes a conversation mode, and when the information received by the antenna 11 is outputted to the printer portion 113, the mode display 19 assumes a recording mode. In this case, information includes image information and a data code such as a character, word, phrase and the like in addition to voice information.

Description will hereinafter be made of the operation of the pocket telephone with the radio wave receiving and recording apparatus constructed as described above.

Figure 7:
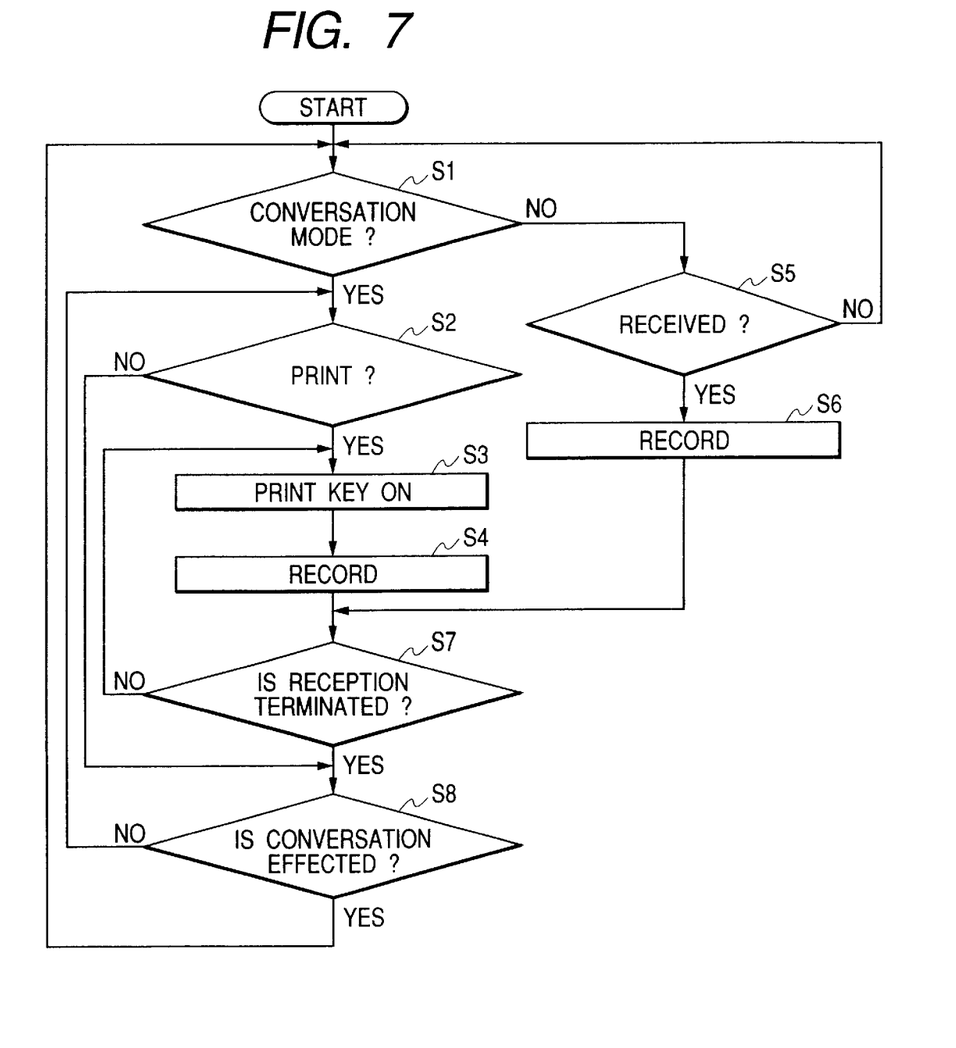
FIG. 7 is a flow chart for illustrating the operation of the radio wave receiving and recording apparatus shown in FIG. 6.

FIG. 7 is a flow chart for illustrating the operation of the radio wave receiving and recording apparatus shown in FIG. 6.

First, whether the mode of the pocket telephone is the conversation mode is judged (step S1).

If at the step S1, it is judged that the mode of the pocket telephone is the conversation mode, whether the conversation should be recorded is judged (step S2).

If at the step S2, it is judged that the conversation, image information or a data code such as a character, word, phrase and the like should be recorded, the print key 14 is set to its ON state (step S3).

Thereupon, the received data is outputted to the printer portion 113, and recording is effected (step S4).

On the other hand, if at the step S1, it is judged that the mode of the pocket telephone is not the conversation mode, whether the data to be recorded has been received is judged (step S5), and if the data to be recorded has been received, recording is effected in the printer portion 113 (step S6).

On the other hand, if at the step S5, it is judged that the data to be recorded has not been received, return is made to the processing at the step S1.

After the recording operation at the step S4 or the step S6, whether the reception of the data to be recorded has been terminated is judged (step S7), and if it is judged that the reception of the data to be recorded has been terminated, whether conversation is further effected is judged (step S8).

On the other hand, if at the step S7, it is judged that the reception of the data to be recorded has not been terminated, return is made to the processing at the step S3.

Also, if at the step S2, it is judged that the conversation is not recorded, shift is made to the processing at the step S8.

If at the step S8, it is judged that the conversation is further effected, return is made to the processing at the step S1, and in the other cases, return is made to the processing at the step S2.

While in the foregoing embodiments, description has been made of an example in which voice information is recorded, the present invention is not restricted thereto, but information such as data can also be recorded, and an example thereof will hereinafter be described.

Fifth Embodiment

Figure 8:
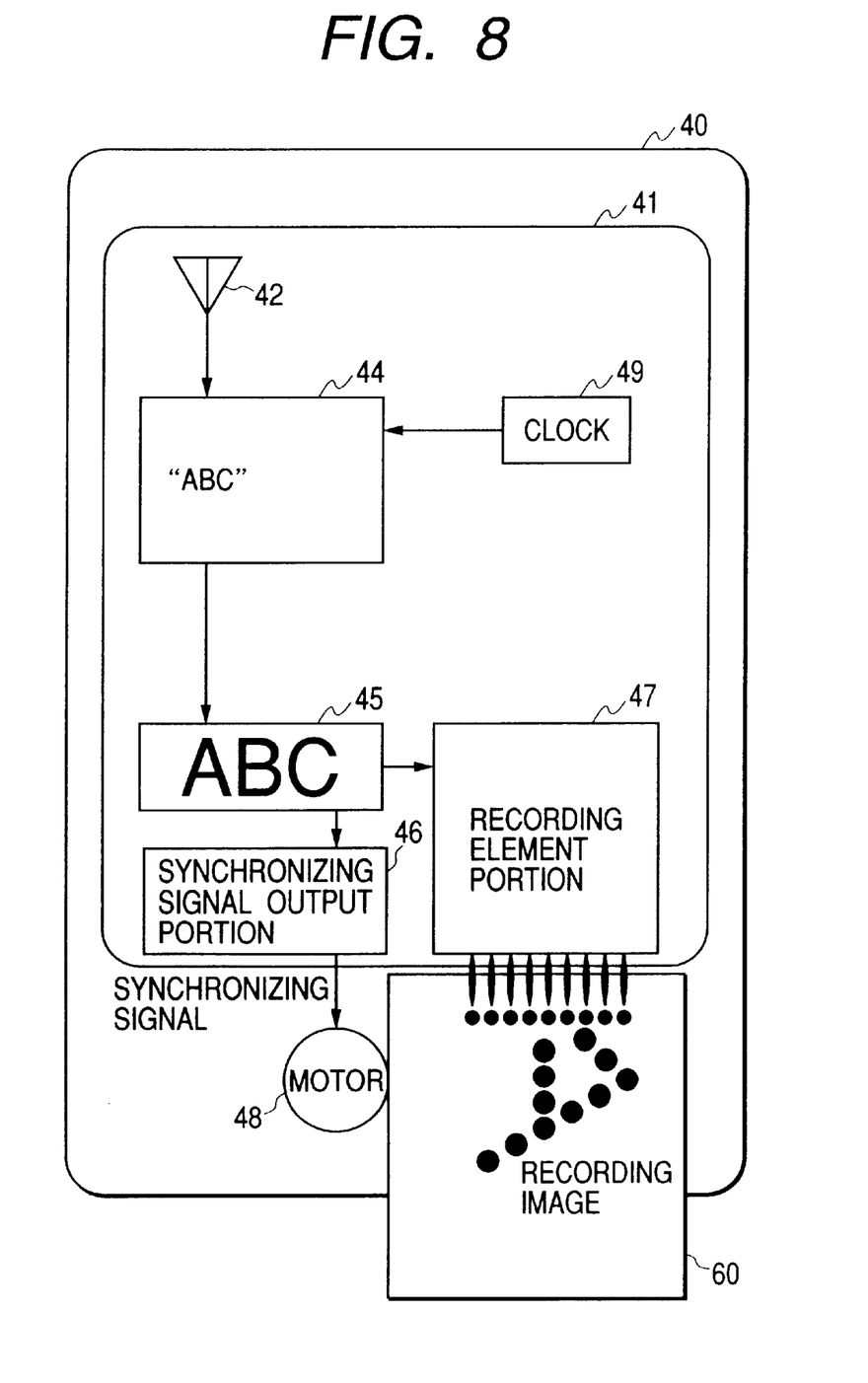
FIG. 8 shows a fifth embodiment of the radio wave receiving and recording apparatus of the present invention.

FIG. 8 shows a fifth embodiment of the radio wave receiving and recording apparatus of the present invention.

This embodiment, as shown in FIG. 8, is of a construction in which the voice data holding portion 43 is eliminated from the construction shown in FIG. 2. This is because in the present embodiment, not voice information, but information such as data is recorded.

In the radio wave receiving and recording apparatus constructed as shown in FIG. 8, when information such as data is received by a radio wave receiving portion 42, the received information is first inputted to a data converting portion 44, in which the inputted information is converted into record data. Data information may be a word code such as character, word and phrase, image data or a data index code for extracting data base registered in the base station 20 and the pocket telephone or the recording apparatus.

The operation thereafter is similar to the operation in the first embodiment. Also, the above-mentioned arrangements of other embodiments may be utilized.

Figure 9:
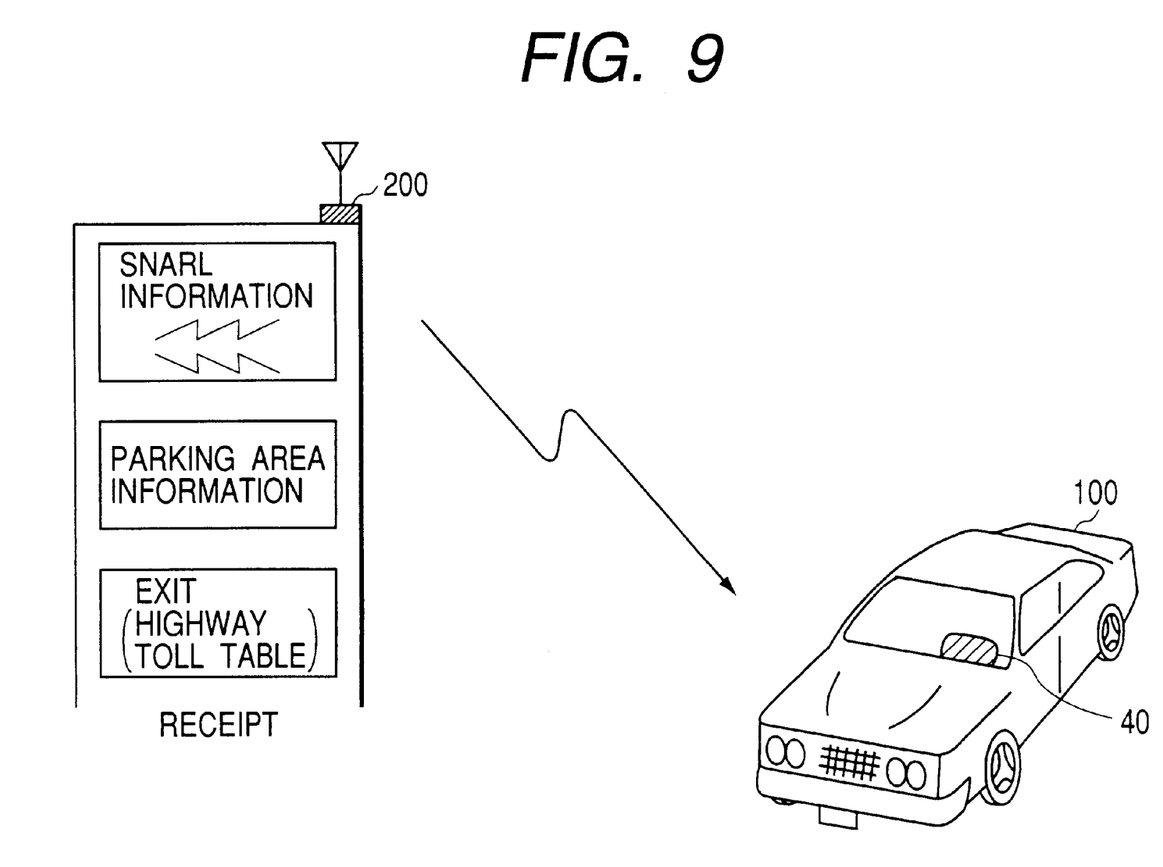
FIG. 9 shows an example of a case where the radio wave receiving and recording apparatus shown in FIG. 8 is provided in an automobile.

FIG. 9 shows an example in which the radio wave receiving and recording apparatus shown in FIG. 8 is provided in an automobile.

In the radio wave receiving and recording apparatus for receiving and recording information such as data as in the present embodiment, when it is provided in an automobile 100, as shown, for example, in FIG. 9, if a radio wave transmitting apparatus 200 is provided along a superhighway or a general road and traffic snarl information, the vacant position information of the parking zone in a service area and the display or the like of the toll at the exit or the like of the superhighway are transmitted from the radio wave transmitting apparatus, such information can be recorded in the automobile 100, whereby important information does not escape the driver's ear and the information the driver wants to obtain can be obtained in a printed form in advance, and this contributes to the alleviation of traffic snarls. The above-mentioned system may be arranged to transmit such information from the radio transmitting apparatus through base station 20.

In this system, basically when information is received by a radio wave, the information is automatically printed out, but with regard to unrequisite information, if the power source of the apparatus is cut off in advance, the unnecessary information will not be printed out. In this case, such information may be temporarily held in the base station 20.

While in the above-described five embodiments, recording is effected with only the recording medium 60 conveyed by the rotation of the motor 48, the present invention is not restricted thereto, but the relative position of the recording head 41 and the recording medium 60 can be changed by the rotation of the motor 48. That is, in not only a line printer but also a serial printer, there may be adopted such a construction that the relative position of the recording head 41 and the recording medium 60 is changed in synchronism with inputted information and data is held during return.

Also, the form of recording is not limited to one using an ink jet head, but one using a thermal head, a piezo head or a BJ head would occur to mind.

As described above, in the present invention, there is adopted a construction in which provision is made of a radio wave receiving portion for receiving a radio wave signal, converting means for converting the radio wave signal received by the radio wave receiving portion into recordable data, a recording element portion for recording the data converted by the converting means on a recording medium, a synchronous signal outputting portion for outputting a synchronous signal synchronized with the timing at which the data converted by the conveying means is delivered to the recording element portion, and position controlling means for changing the relative position of the recording apparatus and the recording medium on the basis of the synchronous signal outputted from the synchronous signal outputting portion, and the position controlling means is driven in synchronism with the timing at which the data converted by the converting means is delivered to the recording element portion, and recording is effected on the recording medium while the relative position of the recording apparatus and the recording medium is changed and therefore, conversation by the use of a pocket telephone or the like through radio can be accurately recorded.

Thereby, even an aurally handicapped person can recognize information transmitted by the use of a pocket telephone or the like.

Further, not only voice but also various information can be printed out at various locations.

Also, if the radio wave receiving portion, the converting means and the recording element portion are provided in the recording head, the system will be simplified and high-speed recording can be realized.

What is claimed is:

1. A radio wave receiving and recording apparatus for recording information transmitted by a radio wave signal on a recording medium, characterized by:

a radio wave receiving portion for receiving said radio wave signal;

converting means for converting the radio wave signal received by said radio wave receiving portion into recordable data;

a recording element portion for recording the data converted by said converting means on said recording medium;

a synchronous signal outputting portion for outputting a synchronous signal synchronized with the timing at which the data converted by said converting means is delivered to said recording element portion; and position controlling means for changing the relative position of said recording apparatus and said recording medium on the basis of the synchronous signal outputted from said synchronous signal outputting portion.

2. A radio wave receiving and recording apparatus for recording information transmitted by a radio wave signal on a recording medium, characterized by:

a radio wave receiving portion for receiving said radio wave signal;

a recognizing portion for recognizing ID information imparted to the radio wave signal received by said radio wave receiving portion, and outputting said radio wave signal only when said ID information is predetermined information;

converting means for converting the radio wave signal outputted from said recognizing portion into recordable data;

a recording element portion for recording the data converted by said converting means on said recording medium;

a synchronous signal outputting portion for outputting a synchronous signal synchronized with the timing at which the data converted by said converting means is delivered to said recording element portion; and position controlling means for changing the relative position of said recording apparatus and said recording medium on the basis of the synchronous signal outputted from said synchronous signal outputting portion.

3. A radio wave receiving and recording apparatus according to claim 1 or 2, characterized in that said synchronous signal outputting portion outputs n (n being a natural number) synchronous signals each time the data converted by said converting means is delivered by a pixel to said recording element portion.

4. A radio wave receiving and recording apparatus according to any one of claims 1 to 2, characterized in that said converting means has:

a voice data holding portion for demodulating the radio wave signal received by said radio wave receiving portion into voice data, and holding it;

a data converting portion for converting the voice data held in said voice data holding portion into a character code or a word code; and an image data holding portion for converting the character code converted by said data converting portion into image data, and holding it.

5. A radio wave receiving and recording apparatus according to claim 4, characterized in that said image data holding portion delivers the held image data by one line each to said recording element portion.

6. A radio wave receiving and recording apparatus according to claim 4, characterized in that said data converting portion has said voice data and a character code or a word code corresponding to said voice data preset therein, and compares and calculates the voice data held in said voice data holding portion and said character code or said word code to thereby convert the voice data held in said voice data holding portion into said character code.

7. A radio wave receiving and recording apparatus according to any one of claims 4, characterized in that said image data holding portion has said character code or said word code and image data corresponding to said character code or said word code preset therein, and compares and calculates the character code or the word code converted by said data converting portion and said image data to thereby convert said character code or said word code into said image data.

8. A radio wave receiving and recording apparatus according to any one of claims 1 to 2, characterized in that it has a clock for recognizing the time when said radio wave has been received, and said recording element portion records on said recording medium said image data and the time when said image data has been received.

9. A radio wave receiving and recording apparatus according to any one of claims 1 to 2, characterized in that it has a clock for recognizing the time when said radio wave has been received, and said recording element portion records on said recording medium said image data and a place where said image data has been received.

10. A radio wave receiving and recording apparatus according to any one of claims 1 to 2, characterized in that said position controlling means conveys said recording medium on the basis of the synchronous signal outputted from said synchronous signal outputting portion.

11. A radio wave receiving and recording apparatus according to any one of claims 1 to 2, characterized in that said position controlling means is a motor.

12. A radio wave receiving and recording apparatus according to any one of claims 1 to 2, characterized in that said radio wave signal is a radio wave signal transmitted and received by a pocket telephone preset correspondingly to said recording apparatus.

13. A radio wave receiving and recording apparatus according to any one of claims 1 to 2, characterized in that said radio wave receiving portion, said converting means and said recording element portion are provided in a recording head detachably attachable to said recording apparatus.

* * * * *